United States Patent
Eger et al.

(10) Patent No.: US 9,768,634 B2
(45) Date of Patent: Sep. 19, 2017

(54) FACILITY FOR CONTROLLING CHARGE CURRENT FOR STORAGE UNITS IN ELECTRICAL ENERGY SUPPLY GRIDS CONNECTING DISTRIBUTED GENERATORS AND DISTRIBUTED STORAGE UNITS, AMONG OTHERS

(75) Inventors: Kolja Eger, Ottobrunn (DE); Roland Gersch, Munich (DE); Joerg Heuer, Oberhaching (DE); Martin Winter, Rosenheim (DE)

(73) Assignee: Caterva Gmbh, Pullach (DE)

( * ) Notice: Subject to any disclaimer, the term of this patent is extended or adjusted under 35 U.S.C. 154(b) by 328 days.

(21) Appl. No.: 14/418,017

(22) PCT Filed: Jul. 31, 2012

(86) PCT No.: PCT/EP2012/064925
§ 371 (c)(1),
(2), (4) Date: Jun. 1, 2015

(87) PCT Pub. No.: WO2014/019605
PCT Pub. Date: Feb. 6, 2014

(65) Prior Publication Data
US 2015/0280458 A1    Oct. 1, 2015

(51) Int. Cl.
*H01M 10/46* (2006.01)
*H02J 7/00* (2006.01)
*H02J 3/32* (2006.01)
*H02J 3/38* (2006.01)
*H02J 13/00* (2006.01)
*H02J 7/35* (2006.01)

(52) U.S. Cl.
CPC ............... *H02J 7/007* (2013.01); *H02J 3/32* (2013.01); *H02J 3/381* (2013.01); *H02J 3/383* (2013.01); *H02J 7/35* (2013.01); *H02J 13/0075* (2013.01); *Y02E 10/563* (2013.01); *Y02E 10/566* (2013.01); *Y02E 40/72* (2013.01); *Y02E 70/30* (2013.01); *Y02P 80/14* (2015.11); *Y02P 80/152* (2015.11); *Y04S 10/12* (2013.01); *Y04S 10/123* (2013.01)

(58) Field of Classification Search
CPC ....................................................... H02J 7/0021
USPC ........................................ 320/107, 104, 109
See application file for complete search history.

(56) References Cited

U.S. PATENT DOCUMENTS

| 8,478,452 B2 * | 7/2013 | Pratt ..................... H01M 10/44 320/128 |
| 2010/0327800 A1 | 12/2010 | Reineccius |
| 2011/0245987 A1 | 10/2011 | Pratt |

(Continued)

FOREIGN PATENT DOCUMENTS

WO    WO 2007/104167 A1    9/2007

*Primary Examiner* — Edward Tso
(74) *Attorney, Agent, or Firm* — Farjami & Farjami LLP

(57) ABSTRACT

The invention essentially relates to a facility for charge current control of storage units in an electrical energy supply grid including, among others, distributed generators and distributed storage units, in which a logic unit is present such that, a storage charge current value can be determined for the storage unit as a function of control variables transferred via a communication system of measurement variables determined at the storage and of locally held internal control variables. This represents an important component for achieving the optimum possible overall utilization of the distributed and multiple-use energy storage.

15 Claims, 3 Drawing Sheets

(56) References Cited

U.S. PATENT DOCUMENTS

Figure 1:
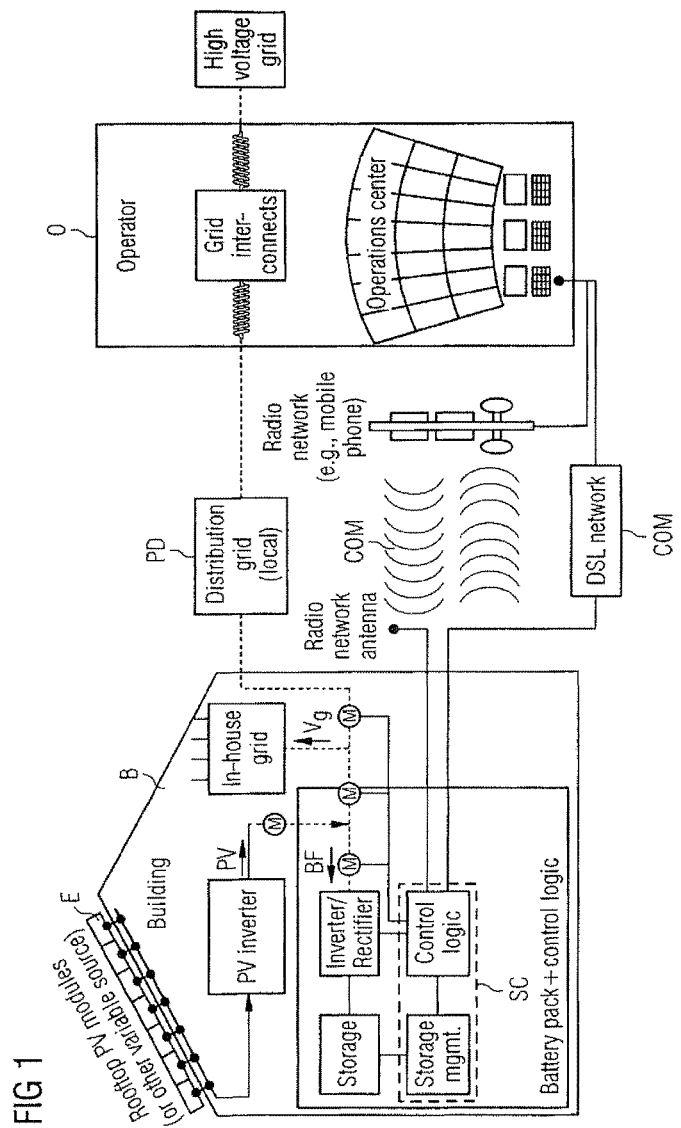

2012/0133333 A1  5/2012  Morioka
2013/0179061 A1* 7/2013  Gadh ................. B60L 11/1842
                                              701/123

* cited by examiner

FACILITY FOR CONTROLLING CHARGE CURRENT FOR STORAGE UNITS IN ELECTRICAL ENERGY SUPPLY GRIDS CONNECTING DISTRIBUTED GENERATORS AND DISTRIBUTED STORAGE UNITS, AMONG OTHERS

This is a U.S. national phase application, which is based on, and claims priority from, PCT application Serial No. PCT/EP2012/064925, filed Jul. 31, 2012.

Facility for controlling charge current for storage units in electrical energy supply grids connecting distributed generators and distributed storage units, among others The invention relates to a facility for controlling charge current for storage units, e.g. charge storage units in the form of accumulators but also thermal storage units or gas storage units, in electrical supply grids with distributed generators, e.g. photovoltaic systems, and distributed storage units, among others.

Renewable energy sources are becoming increasingly important, with these energy sources being distributed and it being difficult to predict the amount of energy that they are able to deliver, because for example in photovoltaic systems there is a dependency on the weather.

This leads to stability and capacity problems in corresponding electrical energy supply grids.

One solution for this problem lies in distributed energy and charge storage units. Such storage however is relatively expensive and must be used effectively, by multiple use for example.

The underlying object of the invention now consists of specifying a facility for controlling charge current for storage units in electrical energy supply grids connecting, among others, distributed generators and distributed storage units such that, taking into account the locally limited amount of energy and the energy availability resulting from a multiple use of the storage unit, the optimum possible overall utilization of the storage is possible.

This object is achieved in accordance with the invention by the features of claim 1. The further claims relate to preferred embodiments of the invention.

The invention essentially relates to a facility for controlling charge current of storage units in an electrical energy supply connecting, among others, distributed generators and distributed storage units, in which a logic unit is present such that for the storage unit a storage charge current value can be determined as a function of control variables transferred by means of a communication system, of measurement variables determined at the storage and of locally held internal control variables. This represents an important element for achieving an optimum possible overall utilization of the distributed and multiple-use energy storage unit.

In this document, note the following definition: the term "grid balancing" refers to the provision of a current towards any of the following ends: frequency stabilization, voltage stabilization, AC power Quality improvement such as the control of higher harmonics, control of power exchanges between different voltage levels or different control areas of a power distribution or transmission grid, control of reactive power, and control of the maximum current level in a subgrid or busbar.

Figure 2:
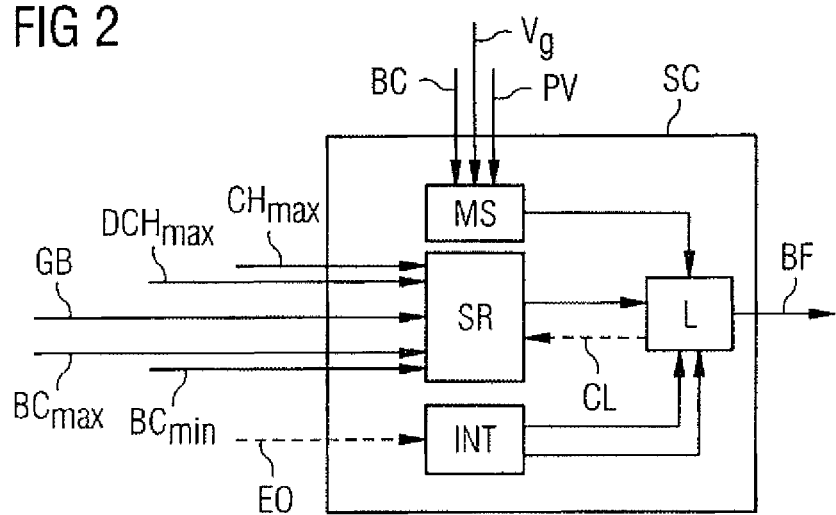
Figure 3:
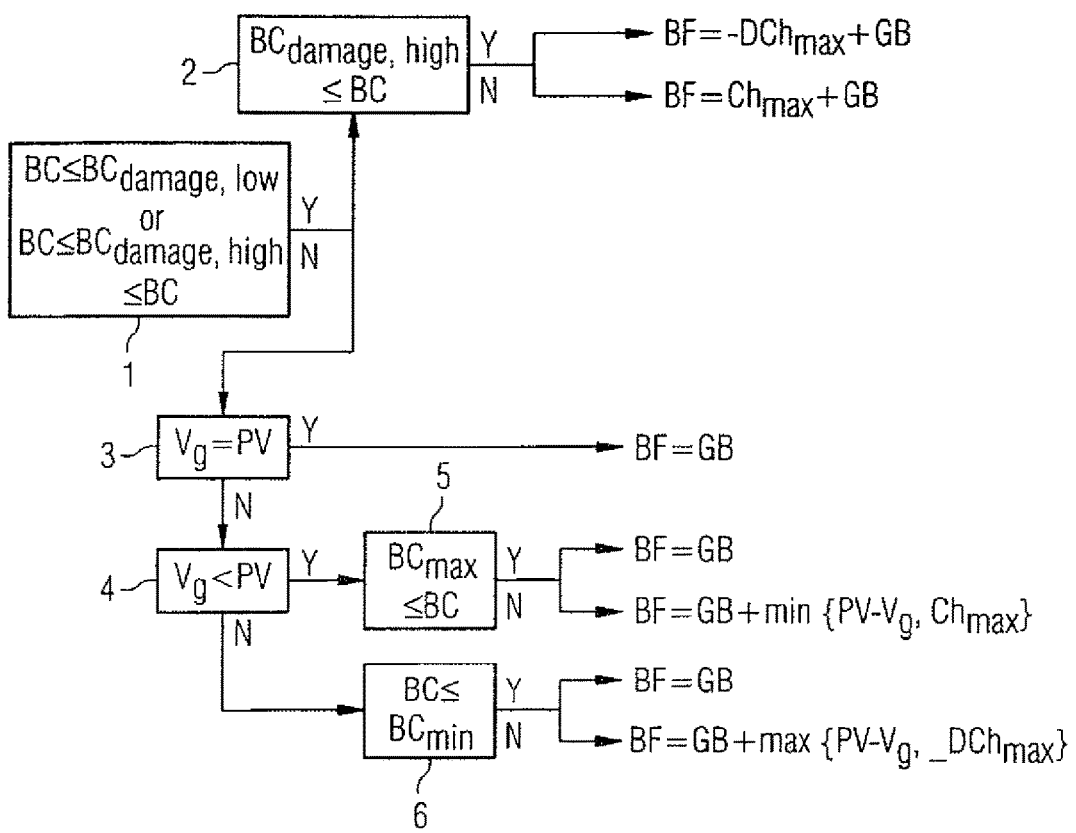

The invention will be explained below on the basis of exemplary embodiments presented in the drawing, in which FIG. 1 shows an overview diagram to explain the environment of the inventive facility, FIG. 2 shows a basic diagram to explain the inventive facility and FIG. 3 shows a logic diagram to explain the functioning of the inventive facility.

FIG. 1 shows an overview diagram to explain the environment of the inventive facility with a building B, on the roof of which a local generator E is present in the form of photovoltaic cells and in which, besides units such as inverters/rectifiers and measurement devices M, a storage unit S, for example an accumulator, and a storage control unit SC, are located. This building B is connected for power distribution via a local power distribution grid PD to further buildings or energy generators and storage units as well as to an operations center O and is also connected to the operations center O for communication, for example via DSL or mobile radio.

FIG. 2 shows a basic diagram to explain the inventive facility in the form of a storage control unit SC in which a logic unit L is present such that, for the storage unit S, a storage charge current value BF can be determined as a function of control variables SR transferred via a communication system, measurement variables MS determined at the storage unit S and locally held internal control variables INT.

The control variables SR transferred by the communication system in this case advantageously contain at least one of the following variables: a specification of a maximum charge current Chmax for local use, a specification of a maximum discharge current DChmax for local use, a specification of a current GB for grid balancing, a specification of a maximum charge state BCmax of the storage and a specification of a minimum charge state BCmin of the storage. One or more of these variables can be permanently configured locally and do not necessarily have to be transferred.

Optionally, one or more of the control variables SR transferred via the communication system can alternatively be created in the event of a communications loss CL by the logic unit L as a function of measurement variables MS and the locally held internal control variables INT.

The measurement variables MS determined at the storage unit S advantageously contain at least one of the following: a specification of a charge state BC of the storage unit, a specification of a current $V_g$ for supplying a local grid and a specification of a current PV from an inverter or the local generator E. All of these measurement variables except the specification of the charge state BC of the storage unit can be determined from measured variables of the measurement devices M shown in FIG. 1.

The locally held internal control variables INT advantageously contain at least one specification of a maximum safe charge state $BC_{damage,high}$ of the storage and a specification of a minimum safe charge state $BC_{damage,low}$ of the storage.

Optionally these locally held internal control variables INT can also be replaced by corresponding communicated variables EO.

FIG. 3 shows a logic diagram illustrating the functioning of the inventive facility or of the logic unit L contained therein.

Here a first condition 1 is initially evaluated as to whether the charge state BC of the storage unit S is outside a closed interval delimited by the minimum safe charge state $BC_{damage,low}$ and the maximum safe charge state $BC_{damage,high}$.

Where the first condition 1 is fulfilled, a second condition 2 is evaluated as to whether the specification of a maximum safe charge state $BC_{damage,high}$ is less than or equal to the charge state value BC of the storage and, where this is also the case, the charge state current value BE is formed from the sum of the specification of the negative maximum discharge current DChmax for local use and the specification of the current GB for grid balancing and, where the second condition 2 is not fulfilled, the storage charge current value BF is formed from the sum of the specification of the maximum charge current Chmax for local use and the specification of the current GB for grid balancing.

Where however the first condition 1 is not fulfilled, a third condition 3 is checked as to whether the specification of a current $V_g$ for supplying a local grid corresponds to the specification of the current PV from the local generator E and, where this is the case, the storage charge current value BE is set equal to the specification of the current GB for grid balancing and, where the latter is not the case, a fourth condition 4 is checked as to whether the specification of the current $V_g$ for supplying a local grid is less than the specification of the current PV from the local generator E.

Where the fourth condition 4 is fulfilled, a fifth condition 5 is checked as to whether the specification of the maximum charge state BCmax of the storage is less than or equal to the charge state value BC of the storage and, where this is the case, the storage charge current value BF is set equal to the specification of the current GB for grid balancing and, where the latter is not the case, the storage charge current value BF is set equal to a sum of the specification of the current GB for grid balancing and the minimum of (a) the specification of the current PV from the local generator B reduced by the current value $V_g$ for supplying a local grid and (b) the specification of the maximum charge current Chmax for local use.

Where the fourth condition 4 is not fulfilled however, a sixth condition 6 is evaluated as to whether the specification of the minimum charge state BCmin of the storage is greater than or equal to the charge state value BC of the storage and, where this is the case, the storage charge current value BF is set equal to the specification of the current GB for grid balancing and, where the latter is not the case, the storage charge current value BF is set equal to a sum of the specification of the current GB for grid balancing and a maximum of (c) a specification of the current PV from the local generator E reduced by the current value $V_g$ for supplying a local grid and (d) the negative specification of the maximum discharge current DChmax for local use.

The invention claimed is:

1. A facility for controlling the charge current of a storage unit in an electrical energy supply grid with distributed storage units, the facility comprising:
   a logic unit and a communication system;
   wherein a charge current value can be determined for the storage units as a function of control variables transferred via the communication system, and locally held internal control variables;
   wherein the control variables transferred via the communication system are created by the logic unit in an event of a communication outage.

2. The facility as claimed in claim 1, wherein the control variables transferred by a communication system contain at least one of the following variables:
   a specification of a maximum charge current for local use;
   a specification of a maximum discharge current for local use;
   a specification of a current for grid balancing;
   a specification of a maximum charge current of the storage; and
   a specification of a minimum charge current of the storage.

3. The facility as claimed in claim 1, wherein the measurement variables determined at the storage unit contain at least a specification of a charge state of the storage, a specification of a current for supplying a local grid or a specification of a current from the local generator.

4. The facility as claimed in claim 2, wherein the measurement variables determined at the storage unit contain at least a specification of a charge state of the storage, a specification of a current for supplying a local grid or a specification of a current from the local generator.

5. The facility as claimed in claim 1, wherein the locally held internal control variables contain at least a specification of a maximum safe charge state of the storage or a specification of a minimum safe charge state of the storage.

6. The facility as claimed in claim 2, wherein the locally held internal control variables contain at least a specification of a maximum safe charge state of the storage or a specification of a minimum safe charge state of the storage.

7. The facility as claimed in claim 3, wherein the locally held internal control variables contain at least a specification of a maximum safe charge state of the storage or a specification of a minimum safe charge state of the storage.

8. The facility as claimed in claim 4, wherein the locally held internal control variables contain at least a specification of a maximum safe charge state of the storage or a specification of a minimum safe charge state of the storage.

9. The facility as claimed in claim 1, wherein the locally held internal control variables can be replaced in an emergency by corresponding variables transferred via a communication system.

10. The facility as claimed in claim 2, wherein the locally held internal control variables can be replaced in an emergency by corresponding variables transferred via a communication system.

11. The facility as claimed in claim 3, wherein the locally held internal control variables can be replaced in an emergency by corresponding variables transferred via a communication system.

12. The facility as claimed in claim 3, wherein the logic unit is present such that, a first condition is checked as to whether the charge state of the storage unit is outside a closed interval delimited by the specification of the minimum safe charge state and the specification of the maximum safe charge state, and where this is the case, through suitable setting of the charge current value of the storage unit, the charge state of the storage unit is brought back into the interval and in addition a current for grid balancing is provided.

13. The facility as claimed in claim 12, wherein the suitable setting of a current for local use for taking the charge state back into the interval is defined such that, a second condition is checked as to whether the specification of a maximum safe charge state is less than or equal to the charge state value of the storage unit and, where this is the case, the storage charge current value is formed from a sum of the specification of the negative maximum discharge current for local use and the specification of the current for grid balancing and, where the second condition is not fulfilled, the storage charge current value is formed from the sum of the specification of the maximum charge current for local use and the specification of the current for grid balancing.

14. The facility as claimed in 3, wherein the logic unit is present such that an over/undersupply of a local grid with the current from the local generator is used for charging or discharging the storage unit and additionally a current for grid balancing is added to the charge/discharge current of the storage unit.

15. The facility as claimed in claim 14, wherein the use of the over/undersupply of the local grid with the current from the local generator is regulated so that:

a third condition is checked as to whether the specification of the current for supplying a local grid corresponds to the specification of the current from the local generator and, where this is the case, the storage charge current value is set equal to the current for grid balancing and, if the latter is not the case, a fourth condition is checked as to whether the specification of the current for supplying a local grid is less than the specification of the current from the local generator;

where the fourth condition is fulfilled, a fifth condition is checked as to whether the specification of the maximum charge current of the storage unit is less than or equal to the charge state value of the storage unit and, if this is the case, the storage charge current value is set equal to the specification of the current for grid balancing and, if the latter is not the case, the storage charge current value is set equal to a sum of the specification of the current for grid balancing and a minimum of (a) the specification of the current from the local generator reduced by the current value for supplying a local grid and (b) the specification of the maximum charge current for local use; and where the fourth condition is not fulfilled, a sixth condition is checked as to whether the specification of the minimum charge state of the storage unit is greater than or equal to the charge state value of the storage unit and, if this is the case, the storage charge current value is set equal to the specification of the current for grid balancing and, if the latter is not the case, the storage charge current value is set equal to a sum of the specification of the current for grid balancing and a maximum of (c) a specification of the current from the local generator reduced by the current value for supplying a local grid and (d) the negative specification of the maximum discharge current for local use.

\* \* \* \* \*

UNITED STATES PATENT AND TRADEMARK OFFICE
CERTIFICATE OF CORRECTION

PATENT NO. : 9,768,634 B2  
APPLICATION NO. : 14/418017  
DATED : September 19, 2017  
INVENTOR(S) : Eger et al.

Page 1 of 1

It is certified that error appears in the above-identified patent and that said Letters Patent is hereby corrected as shown below:

In the Claims

Column 4, Line 62, In Claim 14 "as claimed in 3," should be --as claimed in claim 3,--

Signed and Sealed this  
Tenth Day of April, 2018

Andrei Iancu  
*Director of the United States Patent and Trademark Office*